United States Patent
Dunnu

(10) Patent No.: US 10,309,648 B2
(45) Date of Patent: Jun. 4, 2019

(54) SYSTEM AND METHOD FOR ACTIVE COOLING OF A GRATE BAR FOR AN INCINERATOR OF A WASTE-TO-ENERGY PLANT

(71) Applicant: GENERAL ELECTRIC TECHNOLOGY GMBH, Baden (CH)

(72) Inventor: Gregory Dunnu, Nuertingen (DE)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 15/358,442

(22) Filed: Nov. 22, 2016

(65) Prior Publication Data

US 2018/0142889 A1    May 24, 2018

(51) Int. Cl.
    *F23H 3/02* (2006.01)
(52) U.S. Cl.
    CPC ..................................... *F23H 3/02* (2013.01)
(58) Field of Classification Search
    CPC .......................................................... F23H 3/02
    See application file for complete search history.

(56) References Cited

U.S. PATENT DOCUMENTS

| | | | |
|---|---|---|---|
| 4,463,688 A | 8/1984 | Andreoli | |
| 5,245,983 A | 9/1993 | Krieger | |
| 5,899,150 A | 5/1999 | Martin et al. | |
| 6,269,756 B1 | 8/2001 | Sachs et al. | |
| 8,602,020 B2 * | 12/2013 | Marple | F23B 60/02 |
| | | | 126/540 |

| | | | |
|---|---|---|---|
| 2006/0000396 A1 | 1/2006 | Esser et al. | |
| 2006/0011114 A1 | 1/2006 | Esser | |
| 2011/0253018 A1 | 10/2011 | Brennwald | |

(Continued)

FOREIGN PATENT DOCUMENTS

| | | |
|---|---|---|
| CA | 2206725 A1 | 12/1997 |
| CN | 201992669 U | 9/2011 |
| DE | 112 401 C | 8/1900 |

(Continued)

OTHER PUBLICATIONS

International Invitation to Pay Additional Fees issued in connection with corresponding PCT Application No. PCT/EP2017/079728 dated Feb. 21, 2018.

(Continued)

*Primary Examiner* — David J Laux
(74) *Attorney, Agent, or Firm* — Charlotte C. Wilson; Frank A. Landgraff

(57) ABSTRACT

A cooling system for a grate bar of an incinerator of solid materials is provided includes a feed grate having a plurality of grate bars, at least one of the grate bars including a body having a top surface, a bottom surface, a first end and a second end, a first aperture in the body and a second aperture in the body, and an internal passageway defined within the body and fluidly connecting the first aperture to the second aperture, the first aperture arranged to receive a gas therethrough into the body, and the second aperture arranged to provide an egress for the gas out of the body. The cooling system further includes a manifold duct fluidly coupled to the second aperture for receiving the gas from the second aperture. The gas is independent of the primary combustion air of the incinerator.

20 Claims, 5 Drawing Sheets

(56) References Cited

U.S. PATENT DOCUMENTS

2013/0306050 A1 11/2013 Koch
2015/0027355 A1 1/2015 Bachman et al.

FOREIGN PATENT DOCUMENTS

| | | |
|---|---|---|
| DE | 959212 C | 2/1957 |
| DE | 2833255 A1 | 2/1980 |
| DE | 3343024 A1 | 6/1985 |
| DE | 3434970 A1 | 10/1986 |
| DE | 3724523 A1 | 2/1989 |
| DE | 4226632 C1 | 7/1993 |
| DE | 19648128 A1 | 5/1998 |
| DE | 102014015916 A1 | 5/2016 |
| EP | 0103202 A1 | 3/1984 |
| EP | 0924464 A1 | 6/1999 |
| EP | 0 972 989 A1 | 1/2000 |
| EP | 1355112 A1 | 10/2003 |
| EP | 2778523 A1 | 9/2014 |
| EP | 3023694 A1 | 5/2016 |
| JP | H05-66006 A | 3/1993 |
| JP | H109527 A | 1/1998 |
| WO | 2016041652 A1 | 3/2016 |

OTHER PUBLICATIONS

International Search Report and Written Opinion issued in connection with corresponding PCT Application No. PCT/EP2017/079728 dated Apr. 17, 2018.

\* cited by examiner

SYSTEM AND METHOD FOR ACTIVE COOLING OF A GRATE BAR FOR AN INCINERATOR OF A WASTE-TO-ENERGY PLANT

BACKGROUND

Technical Field

Embodiments of the invention relate generally to combustion systems and devices and, more particularly to a system and method for cooling the grate bars in an incinerator of a waste-to-energy plant.

Discussion of Art

For the combustion of various fuels such as household trash, industrial waste, wood chips, solid or porous fuels, and fuels which are easy to ignite and those which are difficult, the conventional practice is to use incinerators with combustion chambers, in which the fuel is placed on, for example, a mechanically actuated grate, on which it is burned.

In connection with the above, existing waste-to-energy plants are often designed and built on the basis of pusher grate firing systems. The pusher grate consists of partially overlapping assemblies of grate bars (also referred to as grate blocks) on which the waste is burned. Due to the pushing action of the grate bars, the waste bed is turned and loosened, and by so doing, drying, ignition and burnout are enhanced.

Using global air staging combustion techniques, the availability of oxygen is minimized during the critical early phase of combustion when volatile nitrogen species are formed. The total amount of air needed for combustion is therefore separated into three components, primary air, secondary air and tertiary air. The primary air is typically supplied to compartments beneath the grate assembly and enters the combustion chamber via openings in the grate bars, whereas the secondary air and/or tertiary air are injected into the hot combustion gases above the waste bed on the grate. The primary air, secondary air and tertiary air are therefore considered to be independent from one another.

Depending on the net caloric value (NCV) of the waste material, one or more cooling mechanisms are typically employed to protect the entire grate assembly against wear, thermal degradation, corrosion, cracks and erosion as a result of excessive thermal load on the grate bars. These cooling mechanisms may include, for example, cooling using primary air, wherein primary air en route to the combustion chamber is passed through ducts, channels, orifices or the like underneath the grate bars, thereby simultaneously cooling the grate bars and pre-warming the primary air. While generally suited for what may be regarded as ordinary performance, cooling using primary air may not be sufficient when the mean NCV of the waste fuel exceeds about 12 MJ/kg.

Another known cooling technique involves the use of water-cooled grate bars, wherein a cooling fluid such as water is circulated through channels or ducts within the grate bars to cool the grate bars.

As indicated above, known air-cooled grate bars typically cannot withstand high thermal load and are often limited to a maximum thermal load on the grate of about 1 MW/m$^2$ on the grate. Moreover, while water-cooled grate bars can withstand approximately 20% more thermal load on the grate (e.g., in the range of about 1.3 MW MW/m$^2$), other challenges such as water leakages with associated subsequent combustion problems and the need for a high-pressure water circuit system and auxiliary equipment make such water-cooled systems more difficult and costly to effectively employ.

In view of the above, there is a need for a system and method for more effectively cooling grate bars in the incinerator of a waste-to-energy plant.

BRIEF DESCRIPTION

In an embodiment, a cooling system for a grate bar of an incinerator of solid materials is provided. The cooling system includes a feed grate having a plurality of grate bars, at least one of the grate bars including a body having a top surface, a bottom surface, a first end and a second end, a first aperture in the body and a second aperture in the body, and an internal passageway defined within the body and fluidly connecting the first aperture to the second aperture, the first aperture arranged to receive a gas therethrough into the body, and the second aperture arranged to provide an egress for the gas out of the body. The cooling system further includes a manifold duct fluidly coupled to the second aperture for receiving the gas from the second aperture. The gas is independent of the primary combustion air of the incinerator.

In another embodiment, a method for cooling a grate bar of an incinerator is provided. The method includes the steps of passing a gas to a first aperture in a body of a grate bar circulating the gas through an internal passageway of the grate bar, and receiving, in a manifold duct connected to a second aperture in the body of the grate bar, the gas. The gas is independent of primary combustion air of the incinerator.

In yet another embodiment, a grate bar for an incinerator is provided. The grate bar includes a body having a top surface, a bottom surface, a first end and a second end opposite the first end, an first aperture formed in the body, a second aperture formed in the body, and an internal passageway defined within the body and fluidly connecting the first aperture to the second aperture. The first aperture is configured to receive a gas for circulation through the internal passageway to the second aperture. The gas is independent from of primary combustion air for the incinerator.

DRAWINGS

The present invention will be better understood from reading the following description of non-limiting embodiments, with reference to the attached drawings, wherein below:

DETAILED DESCRIPTION

Figure 1:
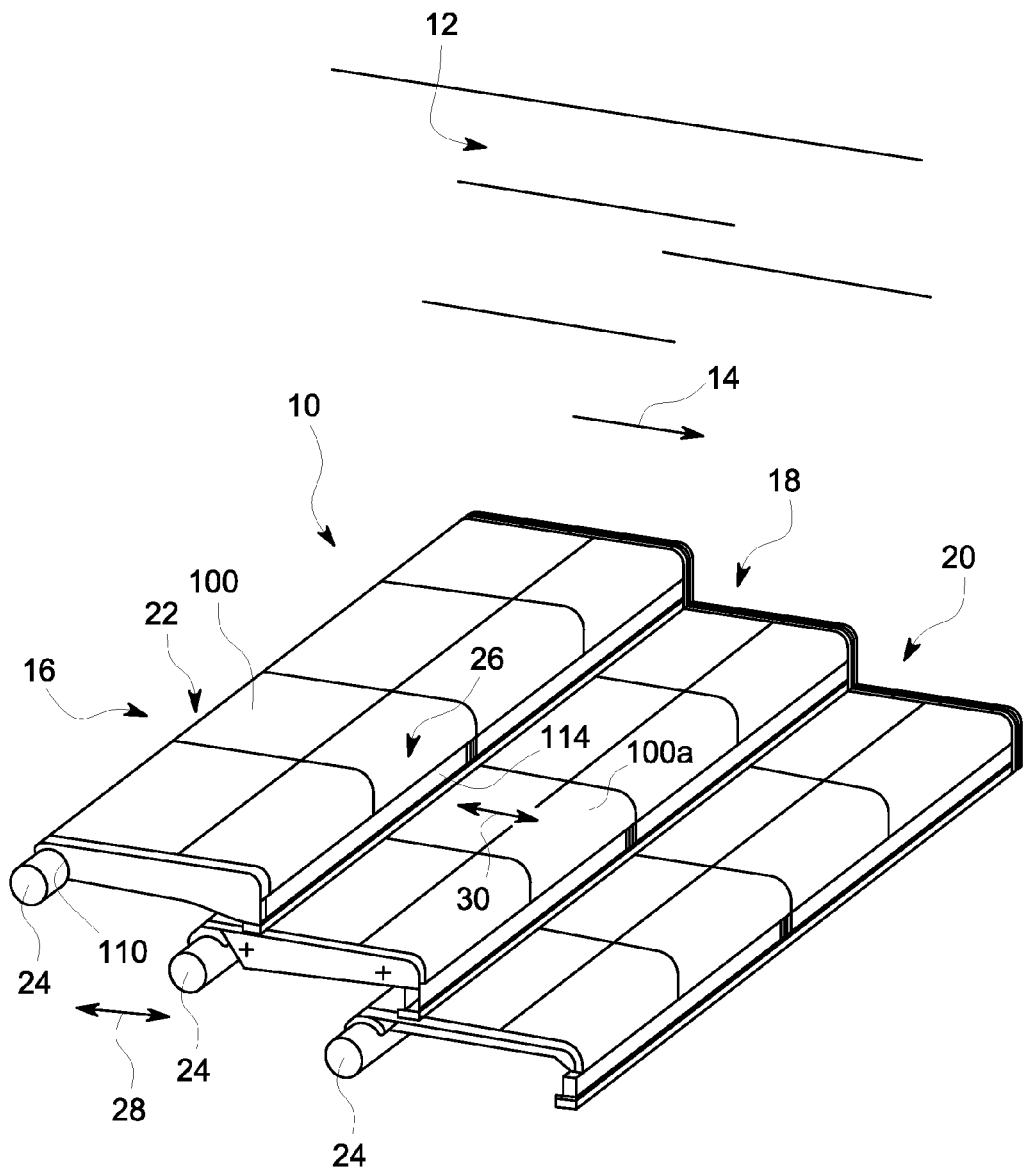
FIG. 1 is a simplified schematic, perspective view of a feed grate having several grate bars, shown mounted in the interior of an incinerator, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for cooling grate bars or grate blocks for use in the furnace of a waste-to-energy plant, embodiments of the invention may also be suitable for cooling other components and structures exposed to high temperatures in waste-to-energy plants or other combustion systems, more generally.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer.

Embodiments of the invention relate to a grate bar and a system and method for cooling a grate bar of an incinerator of a waste-to-energy plant. The grate bar includes a body having a top surface for holding solid materials to be incinerated, a bottom surface, a rearward end and a forward end, the forward end defining a nose and a foot, an inlet in the bottom surface, an outlet in the bottom surface, and an internal passageway embedded within the body and fluidly connecting the inlet to the outlet. The inlet is configured to receive a gaseous cooling fluid for circulation through the internal passageway to the outlet. The gaseous cooling fluid is configured to extract heat from the body of the grate bar, and is independent of primary combustion air supplied beneath grate bar for combustion of the solid materials.

FIG. 1 illustrates a portion of a feed grate 10, positioned in the incineration chamber 12 of a trash or waste incinerator (not shown in detail). The feed grate 10 is made up of multiple, individual grate bars 100 (also referred to as grate plates), several of which are arranged side-by-side in a direction perpendicular to the longitudinal direction 14 of the furnace. A plurality of grate bars 100 constitute a grate-bar array 16, and the feed grate 10 is comprised of several such successive grate-bar arrays including, for example, grate-bar arrays 16, 18, 20.

Figure 2:
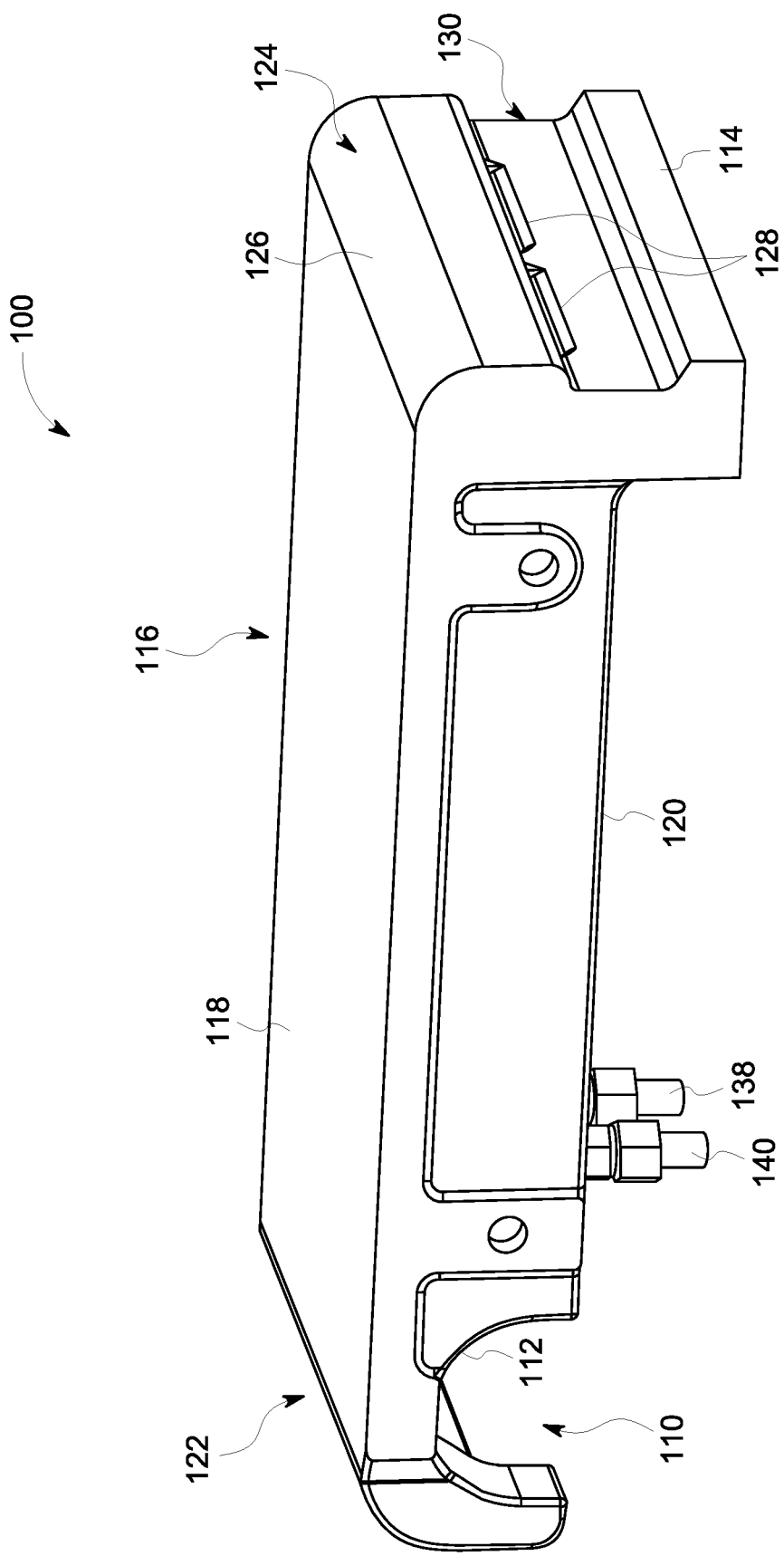
FIG. 2 is a perspective, top view of a grate bar of the feed grate of FIG. 1, according to an embodiment of the invention.
Figure 3:
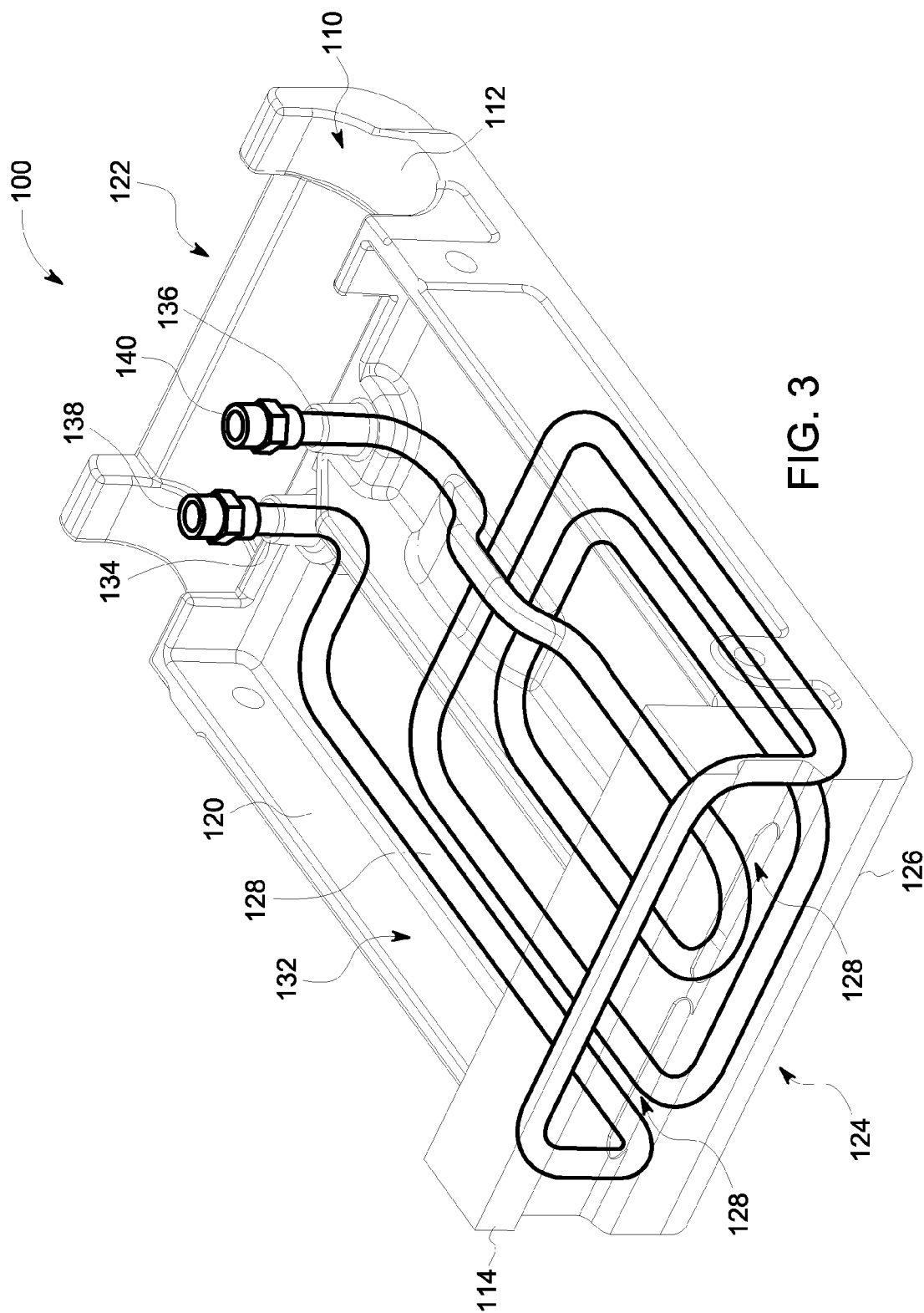
FIG. 3 is a perspective, bottom view of the grate bar of FIG. 2, showing internal structures thereof.

At their upstream end 22, as related to the longitudinal direction 14 of the furnace, the grate bars 100 of array 16 are provided with a horizontal recess 110, more clearly shown for instance in FIGS. 2 and 3, that opens toward the bottom and is equipped on both sides of the grate bar 100 with mouth-shaped seats 112. These seats 112 act as a connecting element such that the seats 112 sit on a grate-plate carrier element that may be for instance in the form of a cylindrical shaft or rod 24 extending across the entire width of the feed grate 10. At its opposite end 26, each grate bar 100 is provided with a foot 114 that serves as a sliding support for the grate bar 100. As can be seen in FIG. 1, the foot 114 rests on the respective grate bar 100a of the grate-bar array 18 that follows. The grate bar 100a thus forms a countersupport for the grate bar 100. The grate bar 100a which, like all other grate bars, is identical to the grate bar 100, has its horizontal recess 110 anchored on a rod 24 which extends across the entire width of the feed grate 10 parallel to the rod 24 associated with the grate bar array 16.

Additional rods 24, distributed over the entire length of the feed grate 10, extend in the horizontal direction. Every other such rod is mounted in fixed position. The rods in between are connected to a drive system which causes each corresponding rod to oscillate back and forth in the direction of the longitudinal orientation 14 of the furnace, as indicated for the grate-bar array 16 by the arrows 28 and 30 in FIG. 1. The result is a staircase-type feed grate 10 whose grate-bar arrays 16, 18, 20 are stepped in staircase fashion, with every other grate-bar array oscillating back and forth in order to move the material to be incinerated in the feed direction 14 of the furnace.

Turning now to FIGS. 2 and 3, the configuration of each grate bar 100 is more clearly illustrated. In an embodiment, the grate bar 100 includes a cast metal body 116 having an upper surface 118, a lower surface 120, a first or rearward end 122 and a second or forward end 124. The upper surface 118 is a substantially flat and rectangular in shape and is configured to accepts the material to be incinerated, as discussed in detail hereinafter. As best shown in FIG. 2, the rearward end 122 and the forward end 124 of the grate bar 100 is slightly rounded. The forward end 124 defines a nose 126 and a foot 114. Slots 128 admitting primary, combustion air open up into a horizontal groove 130 provided between at the forward end 124 between the nose 126 and the foot 114. The air slots 128 connect the combustion chamber 12 with the area underneath the feed grate 10 to which pre-heated combustion air is fed. The air slots 128 are the only connection between the area underneath the feed grate 10 and the combustion chamber 12. Neighboring grate bars 100 are connected to one another in substantially air-tight fashion.

During operation, the grate bars 100 are exposed to considerable heat. To prevent the grate bars 100 from overheating during operation as a result of the incineration of the material carried by them, each grate bar is provided with a cooling loop or heat transfer loop 132 wholly embedded within the body 116 of the grate plate 100. With specific reference to FIG. 3, the cooling loop 132 includes a first aperture or inlet 134 and a second aperture or outlet 136 formed in the underside of the body 116 adjacent to the rearward end 122 thereof. As shown, the inlet 134 and outlet 136 may be arranged side by side just forward of the seat 112. In an embodiment, the inlet 134 and the outlet 136 may each include a fitting 138, 140 for connection with a source and return for a cooling fluid or heat transfer fluid circulated within the loop 132. The cooling loop 132 further includes an internal passageway 142 fluidly connecting the inlet 134 with the outlet 136. As illustrated in FIG. 3, the internal passageway 142 is wholly embedded within the body 116 of the grate bar 100 and does not form any ripple-like structure on the underside of the grate bar 100.

The internal passageway 142 forms several loops throughout the internal volume of the body 116 of the grate plate 100. For example, as illustrated in FIG. 3, the internal passageway 142 extends from the inlet 134 adjacent to the rearward end 122, at a substantially ninety-degree angle towards the adjacent sidewall. The passageway 142 then extends the length of the body 116 to the nose 126, turns ninety-degrees and extends forwardly to the foot 114. The passageway 142 then extends laterally across the forward end 124 of the body 116, turns ninety-degrees upward to the nose 126, and then extends rearward towards the rearward end 122. At an approximate midpoint of the body 116, the passageway 142 turns approximately ninety-degrees inward and makes two spiral loops within the body 116 before extending again rearward to the outlet. As shown in FIG. 3, at least one portion of the spiral loops forms a lateral leg across the nose 126 that runs generally parallel to the lateral leg that extends across the foot 114. In an embodiment, a substantial portion of the passageway 142 is located adjacent to the top surface 118 of the grate bar 100.

In an embodiment, the individual grate bars 100 of the feed grate 10 may be connected to separate cooling fluid supplies. In yet other embodiments, the grate bars 100 may be connected in series.

Figure 4:
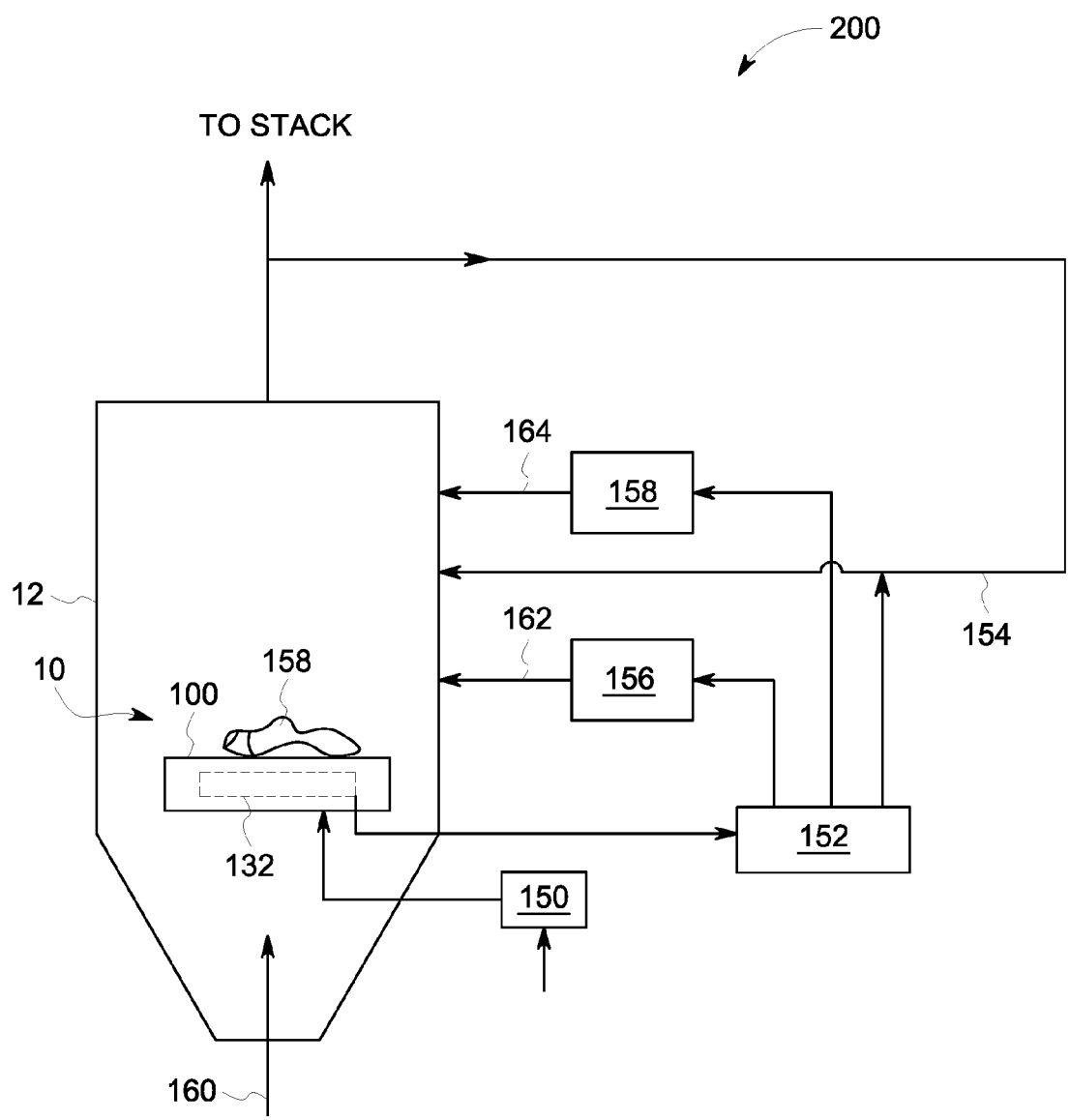
FIG. 4 is a simplified schematic illustration of a portion of a waste-to-energy plant incorporating a grate bar cooling system, according to an embodiment of the invention.

As discussed in detail hereinafter, the cooling loop 132 may form part of an open-loop heat transfer system and may be connected thereto via the fittings 138, 140 associated with the inlet 134 and outlet 136 of the grate plate 100. FIG. 4 is a simplified schematic illustration of a portion an exemplary waste-to-energy plant within which the open-loop grate plate cooling system 200 of the invention may be incorporated. As shown therein, the inlet 134 in the grate bar 100 may receive a gaseous cooling fluid/heat transfer fluid, such as, for example, forced draught air from an intake 150 or other air supply. In an embodiment, the draught air may be taken from ambient air. The draught air is completely separate from the primary air 160 that is introduced below the feed grate 100, and is introduced into the cooling loop 132 within the body 116 of the grate plate 100 through the inlet 134. As the air circulates through the cooling loop 132, it extracts heat from the body 116 of the grate bar 100 as a result of the temperature difference between the draught air and the grate bar body 116, thereby cooling the grate plate 100. The heated draught air then exits the grate plate 100 through outlet 136, where it then enters a manifold duct 152.

As shown in FIG. 4, the manifold duct 152 may be fluidly coupled to one or more of a flue gas recirculation system or line 154, a secondary air system 156, or a tertiary air system 158. In an embodiment, the system may include valves (not shown) for selectively controlling the amount of heated draught air provided to the flue gas recirculation system 154, secondary air system 156 and tertiary air system 158. As is known in the art, the flue gas recirculation system 154 a portion of the flue gases going to the stack and reintroduces them into hot combustion gases above the waste bed 158 on the feed grate 10. Recycling of flue gases serves to impart turbulence, thereby increasing mixing and modifying the oxygen content of the combustion gases above the grate in order to minimize or inhibit the formation of nitrogen oxides. The secondary air system 156 and tertiary air system 158 are configured to inject secondary air 162 and tertiary air 164, respectively, into the hot combustion gases above the waste bed 158 on the feed grate 10. The flue gas recirculation system 154, secondary air system 156 and tertiary air system 158 may take any form known in the art. In an embodiment, the secondary air 162 and tertiary air 164 are completely different and independent of the primary, combustion air 160.

As indicated above, the continuous flow of draught air from intake 150 through the cooling loop 132 takes up heat from the body 116 of the grate bars 100, and as a result attempers the grate bars 100, thereby preventing thermal overload of the grate bars 100. Cooling the grate bars 100 in this manner thereby helps to decrease the wear rate of the grate bars 100, minimize or prevent thermal degradation and corrosion, as well as prevent cracks and erosion. This additional cooling of the grate bars 100 makes it possible to increase the thermal load on the feed grate 10 to values equal to, or even in excess of, that of water-cooled grate bars. Accordingly, the system of the invention can be used for the design of pusher grates of waste-to-energy plants burning waste material with net caloric values of up to 20 MJ/kg, or refuse-derived fuel with even higher net caloric values. In addition, the system of the invention is capable of providing an increase in the thermal output of the grate firing system of about 20% over existing air-cooled grate bars with comparable surface area.

In addition to preventing thermal overload of the grate bars 100 the system of the invention can also be used to pre-warm the secondary air, tertiary air and/or recycled flue gas, providing for bidirectional benefits that increase the efficiency of the waste-to-energy plant, as a whole. In particular, the heat extracted from the grate bars 100 via the draught air circulating through the cooling loop 132 may be reintroduced into the combustion chamber of the furnace via the secondary air system 156, tertiary air system 158 and/or flue gas recirculation system to support or complete a staged combustion process. The grate bars 100 thereby also function as a heat displacement system for preconditioning the flue gas via mixing, and/or pre-warming the secondary air 162 or tertiary air 164 via mixing. In this respect, the heat extracted from the grate bars 100 can be fully returned and used in the combustion process, which leads to improvements in the combustion and energy recovery efficiencies.

As discussed above, the air circulated through the cooling loop is independent from the primary, combustion air 160 used to support initial combustion within the combustion chamber 12. This configuration allows the flow of primary air to be decreased, when needed to optimize combustion, without negatively impacting the ability of the cooling system to cool the grate bars. This is in contrast to existing air-cooled system which utilize the primary combustion air to cool the grate bars. With such existing systems, the cooling air is directly tied to the combustion air, such that decreasing the amount of primary combustion air correspondingly decreases the amount of cooling air provided to the grate bars, affecting the ability to maintain an optimal level of cooling.

Moreover, utilizing forced air to cool the grate plates 100 is substantially less expensive than existing water-cooled systems, which require expensive conduits and associated auxiliary equipment. In addition, the issue of water leakage that is fairly common with exiting water-cooled systems may be obviated.

While the embodiments described above disclose the use of forced draft air from ambient as the cooling fluid circulated through the cooling loop 132, it is contemplated that other gaseous cooling fluids may also be utilized without departing from the broader aspects of the invention. For example, in an embodiment, the cooling fluid may be saturated steam. The saturated steam may be, for example, tapped from the boiler to attemper the grate bars 100. In this embodiment, the saturated steam circuit is coupled with the boiler steam circuit.

In yet other embodiments, the cooling loop 132 within the body 116 of the grate bars 100 may be part of a closed-loop system that utilizes, for example, carbon dioxide or nitrogen gas as the cooling fluid and which includes a heat recovery system on the downstream end after circulation through the grate bars 100. Other gases may also be utilized as the gaseous cooling fluid without departing from the broader aspects of the invention. In an embodiment, the heat recovery system may include, for example, a district heating network, combustion air preheating, condenser preheating, or the like.

Figure 5:
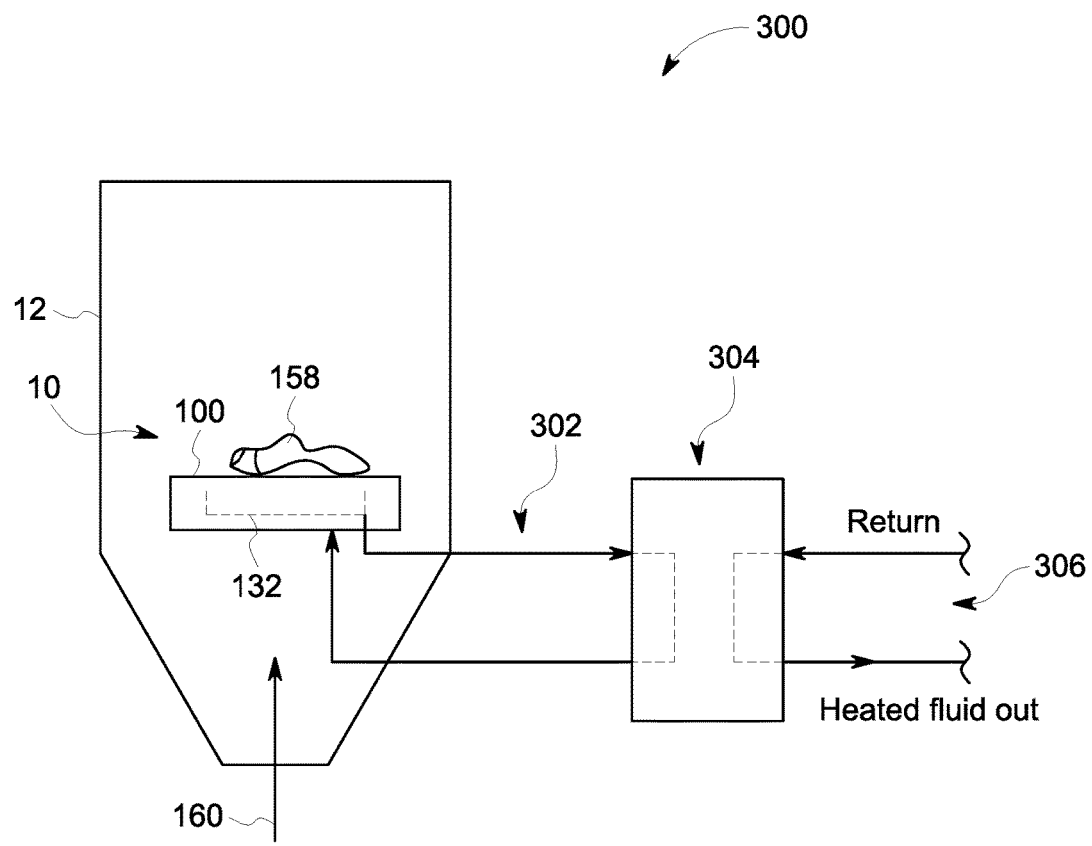
FIG. 5 is a simplified schematic illustration of a portion of a waste-to-energy plant incorporating a grate bar cooling system, according to another embodiment of the invention.

FIG. 5 is a simplified schematic illustration of a portion an exemplary waste-to-energy plant within which the closed-loop grate plate cooling system 300 of the invention may be incorporated. As shown therein, the cooling loop 132 within the grate bars 100 forms a part of a closed loop 302 through which the gaseous cooling fluid is circulated. After removing heat from the grate bars 100 in the manner described above, the heated gaseous fluid is then routed to a heat exchanger 304, where the heat is transferred to another fluid circulating within a heating loop 306 of a heat recovery system. In an embodiment, the heat exchanger 304 is a gas-to-liquid heat exchanger. This fluid can then be utilized to provide heating for other systems and devices. For example, the heating loop 306, having received heat from the closed-loop 302, may be used for preheating combustion air, a condenser or other sub-systems associated with the waste-to-energy plant, and can even be used for auxiliary systems and processes, such as in a district heating network.

In an embodiment, a cooling system for a grate bar of an incinerator of solid materials is provided. The cooling system includes a feed grate having a plurality of grate bars, at least one of the grate bars including a body having a top surface, a bottom surface, a first end and a second end, a first aperture in the body and a second aperture in the body, and an internal passageway defined within the body and fluidly connecting the first aperture to the second aperture, the first aperture arranged to receive a gas therethrough into the body, and the second aperture arranged to provide an egress for the gas out of the body. The cooling system further includes a manifold duct fluidly coupled to the second aperture for receiving the gas from the second aperture. The gas is independent of the primary combustion air of the incinerator. In an embodiment, the cooling system further comprises at least one of a flue gas recirculation system, a secondary air system and a tertiary air system fluidly connected to the manifold duct, wherein the gas within the manifold duct is used to preheat a flue gas of the flue gas recirculation system, a secondary air of the secondary air system or a tertiary air of the tertiary air system, and wherein the secondary air and tertiary air are independent of the primary combustion air. In an embodiment, the flue gas recirculation system is configured to reinject recycled flue gases into hot combustion gases above the feed grate, the secondary air system is configured to inject the secondary air into the hot combustion gases above the feed grate, and the tertiary air system is configured to inject the tertiary air into the hot combustion gases above the feed grate. In an embodiment, the gas is draught air. In an embodiment, the cooling system may also include a heat exchanger fluidly connected to the manifold duct and forming a closed loop with the internal passageway in the body of the grate bar. In an embodiment, the heat exchanger is further configured to transfer heat from the gas to another fluid. In an embodiment, the gas is steam.

In another embodiment, a method for cooling a grate bar of an incinerator is provided. The method includes the steps of passing a gas to a first aperture in a body of a grate bar. circulating the gas through an internal passageway of the grate bar, and receiving, in a manifold duct connected to a second aperture in the body of the grate bar, the gas. The gas is independent of primary combustion air of the incinerator. In an embodiment, the method may also include the step od preheating at least one of recycled flue gas, secondary air and tertiary air utilizing heat extracted from the body of the grate bar by the gas. In an embodiment, the method may also include transferring the heat extracted form the body of the grate bar to a heat recovery system. In an embodiment, the internal passageway forms part of a closed-loop heat transfer system, and the heat recovery system is configured to provide for at least one of condenser preheating and heating for a district heating network. In an embodiment, the gas is one of carbon dioxide, nitrogen and steam. In an embodiment, the gas is draught air.

In yet another embodiment, a grate bar for an incinerator is provided. The grate bar includes a body having a top surface, a bottom surface, a first end and a second end opposite the first end, an first aperture formed in the body, a second aperture formed in the body, and an internal passageway defined within the body and fluidly connecting the first aperture to the second aperture. The first aperture is configured to receive a gas for circulation through the internal passageway to the second aperture. The gas is independent from of primary combustion air for the incinerator. In an embodiment, the first aperture and the second aperture are arranged adjacent to the rearward end of the body. In an embodiment, the second end of the grate bar defines a nose and a foot, and the internal passageway extends through the nose and the foot. In an embodiment, the second aperture is configured for connection to a manifold duct for providing the gas to the manifold duct for preheating at least one of a secondary air stream for injection into a furnace above the grate bar, a tertiary air stream for injection into the furnace of the grate bar, and a recycled flue gas stream. In an embodiment, the gas is draught air. In an embodiment, the gas is one of carbon dioxide, nitrogen and steam. In an embodiment, the internal passageway extends from the first aperture towards an adjacent sidewall, turns ninety-degrees and extends forward to the foot, extends laterally across the second end, turns ninety-degrees upward to the nose, extends rearward towards the first end, at an approximate midpoint of the body turns approximately ninety-degrees inward and makes a plurality of spiral loops within the body, and extends rearward to the second aperture.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a grate bar of an incinerator of solid materials, comprising:
a feed grate having a plurality of grate bars, at least one of the grate bars including a body having a top surface, a bottom surface, a first end and a second end, a first aperture in the body and a second aperture in the body, and an internal passageway defined within the body and fluidly connecting the first aperture to the second aperture, the first aperture arranged to receive a gas therethrough into the body, and the second aperture arranged to provide an egress for the gas out of the body;
a manifold duct fluidly coupled to the second aperture for receiving the gas from the second aperture;
wherein the gas is independent of the primary combustion air of the incinerator.

2. The cooling system of claim 1, further comprising:
at least one of a flue gas recirculation system, a secondary air system and a tertiary air system fluidly connected to the manifold duct;
wherein the gas within the manifold duct is used to preheat a flue gas of the flue gas recirculation system, a secondary air of the secondary air system or a tertiary air of the tertiary air system; and
wherein the secondary air and tertiary air are independent of the primary combustion air.

3. The cooling system of claim 2, wherein:
the flue gas recirculation system is configured to reinject recycled flue gases into hot combustion gases above the feed grate;
the secondary air system is configured to inject the secondary air into the hot combustion gases above the feed grate; and
the tertiary air system is configured to inject the tertiary air into the hot combustion gases above the feed grate.

4. The cooling system of claim 3, wherein:
the gas is draught air.

5. The cooling system of claim 1, further comprising:
a heat exchanger fluidly connected to the manifold duct and forming a closed loop with the internal passageway in the body of the grate bar.

6. The cooling system of claim 5, wherein:
the heat exchanger is further configured to transfer heat from the gas to another fluid.

7. The cooling system of claim 1, wherein:
the gas is steam.

8. A grate bar for an incinerator, comprising:
a body having a top surface, a bottom surface, a first end and a second end opposite the first end;
an first aperture formed in the body;
a second aperture formed in the body; and
an internal passageway defined within the body and fluidly connecting the first aperture to the second aperture;
wherein the first aperture is configured to receive a gas for circulation through the internal passageway to the second aperture; and
wherein the gas is independent from of primary combustion air for the incinerator.

9. The grate bar of claim 8, wherein:
the first aperture and the second aperture are arranged adjacent to the rearward end of the body.

10. The grate bar of claim 8, wherein:
the second end of the grate bar defines a nose and a foot; and
the internal passageway extends through the nose and the foot.

11. The grate bar of claim 10, wherein:
the internal passageway extends from the first aperture towards an adjacent sidewall, turns ninety-degrees and extends forward to the foot, extends laterally across the second end, turns ninety-degrees upward to the nose, extends rearward towards the first end, at an approximate midpoint of the body turns approximately ninety-degrees inward and makes a plurality of spiral loops within the body, and extends rearward to the second aperture.

12. The grate bar of claim 8, wherein:
the second aperture is configured for connection to a manifold duct for providing the gas to the manifold duct for preheating at least one of a secondary air stream for injection into a furnace above the grate bar, a tertiary air stream for injection into the furnace of the grate bar, and a recycled flue gas stream.

13. The grate bar of claim 8, wherein:
the gas is draught air.

14. The grate bar of claim 8, wherein:
the gas is one of carbon dioxide, nitrogen and steam.

15. A method for cooling a grate bar of an incinerator, comprising the steps of:
passing a gas to a first aperture in a body of a grate bar;
circulating the gas through an internal passageway of the grate bar; and
receiving, in a manifold duct connected to a second aperture in the body of the grate bar, the gas;
wherein the gas is independent of primary combustion air of the incinerator.

16. The method according to claim 15, further comprising the step of:
preheating at least one of recycled flue gas, secondary air and tertiary air utilizing heat extracted from the body of the grate bar by the gas.

17. The method according to claim 15, further comprising the step of:
transferring the heat extracted form the body of the grate bar to a heat recovery system.

18. The method according to claim 17, wherein:
the internal passageway forms part of a closed-loop heat transfer system; and
the heat recovery system is configured to provide for at least one of condenser preheating and heating for a district heating network.

19. The method according to claim 18, wherein:
the gas is one of carbon dioxide, nitrogen and steam.

20. The method according to claim 15, wherein:
the gas is draught air.

* * * * *